Figure 1:
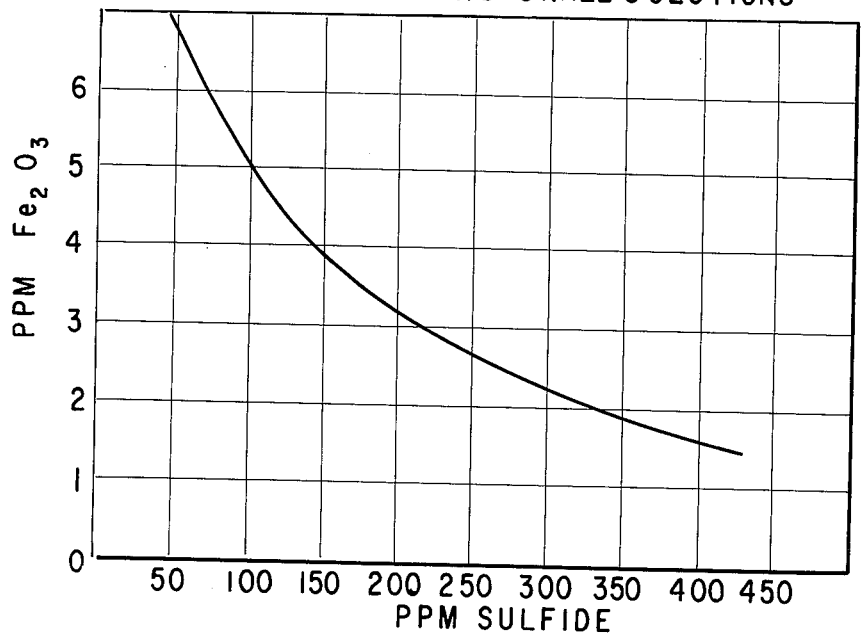

United States Patent Office 3,211,519
Patented Oct. 12, 1965

3,211,519
METHOD OF CONTROLLING SULFIDE CONCENTRATION TO PREVENT IRON CONTAMINATION IN THE PROCESSING OF TRONA
Charles P. Roberts, New York, N.Y., Howard A. Sommers, Allentown, Pa., and Norris J. Brunsvold, Trenton, N.J., assignors, by mesne assignments, to Intermountain Research & Development Corporation, Cheyenne, Wyo., a corporation of Wyoming
Filed Sept. 13, 1961, Ser. No. 137,857
10 Claims. (Cl. 23—63)

This application is a continuation-in-part of an application of Charles P. Roberts, Howard A. Sommers and Norris J. Brunsvold, Serial No. 432,938, filed May 27, 1954, now abandoned.

This invention relates to the preparation of soda ash from crude trona as found in Sweetwater County, Wyoming, and similar deposits found in other parts of the world, and more particularly to the intermediate preparation of a pure crystalline sodium sesquicarbonate or other forms of sodium carbonate crystallized from solutions of crude trona or crude calcined trona.

The trona deposits in Sweetwater and adjacent counties in Wyoming are found at depths ranging from 1100 feet to 1800 feet underground, and consist of a main trona bed varying from 8 to 18 feet in thickness and other beds of smaller thickness. The principal component of trona is sodium sesquicarbonate ($Na_2CO_3 \cdot NaHCO_3 \cdot 2H_2O$) with varying amounts of organic and inorganic impurities. A typical analysis of the crude trona from which the larger pieces of shale have been removed is—

| Constituent: | Percent |
|---|---|
| $Na_2CO_3$ | 45.11 |
| $NaHCO_3$ | 35.75 |
| $H_2O$ | 15.32 |
| $NaCl$ | 0.03 |
| $Na_2SO_4$ | 0.01 |
| $Fe_2O_3$ (total) | 0.11 |
| Insolubles | 3.75 |

The iron content of the crude trona ranges from 0.10% to 0.26% and averages about 0.2%, calculated as $Fe_2O_3$.

In the preparation of pure crystalline sodium sesquicarbonate and other crystallized sodium carbonates from crude trona mineral, such heavy impurities—and particularly iron compounds—have proven very undesirable and have caused considerable difficulty in the process. The principal difficulty of the presence of the iron compounds is that they are carried through the process and are crystallized with the sodium sesquicarbonate or other sodium carbonate crystals and carried into the sodium carbonate (soda ash) made by calcining the sodium sesquicarbonate or other sodium carbonate crystals, thereby contaminating the final soda ash and causing undesirable discoloration of the product. Iron discoloration in soda ash makes it unsuitable for many commercial purposes, such as glass-making, textile operations, etc. Efforts to eliminate such impurities have only been partially successful and necessitated burdensome and costly operational steps.

Therefore, it is a principal object of this invention to provide a method for the preparation of pure crystalline sodium sesquicarbonate and other forms of crystallized sodium carbonate from trona mineral as the starting material.

Another object of the invention is to provide such a process which furnishes this desired result without interfering in other respects with the operation of the process.

Other objects will appear from the consideration of the disclosure of this invention which follows.

In the crystallization of sodium carbonate from solutions of crude trona the crystallization may be caried out to produce crystals of sodium sesquicarbonate, sodium bicarbonate, sodium carbonate monohydrate, anhydrous sodium carbonate and other forms of sodium carbonate crystals which are subsequently calcined or dried to produce soda ash. This invention is applicable to all crystallizations of sodium carbonate crystals from solutions of crude trona by evaporative crystallization or evaporative cooling crystallization, and the term "crystallizing sodium carbonate" as used herein is intended to cover the crystallization of all forms of sodium carbonate crystals from solutions of crude trona or calcined crude trona by such crystallization methods.

Since the commercial preparation of sodium sesquicarbonate and sodium carbonate by crystallization from solutions of crude Wyoming trona mineral is a very recent development, practically no literature was found relating to the problems which have been encountered in this industrial operation. Therefore, it was necessary to enter into a substantial research program to solve the various problems encountered and, as indicated above, one of the principal problems was the elimination of associated mineral impurities, particularly iron compounds.

Early in the research work on the elimination of iron contamination, it was realized that the removal of iron would not be practical if it involved the simultaneous introduction of other impurities. Various chemical precipitants were considered, as well as processes involving the use of adsorbents. Adsorbents were somewhat favored because they normally do not involve the addition of other components which remain in the solution, the adsorbents and any adsorbed impurities, of course, being removed by filtration or other means.

From considerations of the nature of the process liquors, containing a substantial concentration of hydroxyl ions and a high concentration of carbonate and bicarbonate ions, it was expected that very little iron could exist in solution, due to the known very low solubility of iron hydroxide and iron carbonate. On this basis, only a very small portion—on the order of a few parts per million—of chemical precipitant would be necessary on a theoretical basis to remove such low concentrations of iron.

One of the precipitants considered and tested was sodium sulfide, since it was known that—due to the extremely low solubility product—iron and many other heavy metal cations are precipitated from slightly alkaline aqueous solutions by the addition as a soluble sulfide of very small quantities of sulfide ion, as typified by the following equation for ferrous ion:

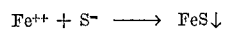

$$Fe^{++} + S^- \longrightarrow FeS\downarrow$$

wherein about 56 parts of iron require only about 52 parts of sulfide ion for precipitation as FeS. Sodium sulfide was selected because of its commercial availability, convenience of usage, and the fact that it does not introduce cations different from those already present.

However, the addition of very small proportions of sodium sulfide did not precipitate iron sulfide, but instead resulted in many additional complications. The process liquors developed a yellow to green color, which could not be removed by filtration, even by the use of filter aids, and the crystalline sesquicarbonate which was separated in the centrifuges appeared to be covered with a greenish slime. This form of iron contamination could not be washed off of the sesquicarbonate crystals, whereas in the absence of sulfide it had been possible by extensive washing to somewhat reduce the iron content of the product. The centrifuges could be operated for only five or ten minutes before they were blinded off by the slimy and discolored crystalline sesquicarbonate. The soda ash prepared from this contaminated sesquicarbonate was entirely unsatisfactory in color and purity.

It was theorized that the iron compound impurities may not be present in the trona mineral as simple iron compounds, wherein the iron would be present—at the expected very low concentration—in the usual cationic form. Instead, the results obtained indicated that the iron might be present in anionic form or as a constituent of a complex organic compound. The existence of such compounds is postulated in U.S. Patent Nos. 2,346,140 and 2,639,217, which describe a process of producing soda ash from crude Wyoming trona and in which the difficulty of iron compound removal is referred to and a remedy based on the use of certain adsorbents is described. Other methods of producing soda ash from crude Wyoming trona are described in U.S. Patent No. 2,770,524. It was recognized that the presence of the iron impurities in such a complex form might best be approached through adsorption techniques.

The study of precipitant purification was therefore discontinued in favor of studies on various adsorbent materials. Many adsorbent materials were tested in this study, including activated carbon, silica gel, magnesia, magnesium silicate (including the formation of this adsorbent in the process liquors by precipitation from the reaction between sodium silicate and magnesium chloride), magnesium carbonate, calcium carbonate, strontium carbonate and alumina. While some of these adsorbents gave a significant reduction in iron content, under certain conditions, the over-all evaluation indicated that this type of purification would not be practical.

Consequently, the emphasis of the research shifted back to further studies on chemical precipitants, since it was imperative that a practical solution be developed to overcome the contamination problem. Studies with various precipitants having proved unsuccessful for a variety of reasons, it was decided to further examine the use of sodium sulfide as a precipitant for the removal of iron contamination, even though previous work with small amounts of sulfide had shown that this approach had only resulted in compounding the difficulties already present.

The first step in the processing of trona is to dissolve the prepared mineral in hot water, or more accurately in a mixture of hot water and mother liquor from the sesquicabonate crystallization step. This hot solution made up at the dissolvers contains about 25% solids, chiefly sodium sesquicarbonate, and has a near-boiling temperature of about 98° C., which is the practical maximum obtainable at the atmospheric pressure existing at the Rocky Mountain area elevation. This hot solution is pumped to clarifiers where some of the insolubles are removed, then decolorized by addition of activated charcoal and filtration as described in said Patent Nos. 2,346,140, 2,639,217 and 2,770,524, cooled preferably in multiple effect vacuum crystallizers to effect crystallization, and the sesquicarbonate crystals or other sodium carbonate crystals removed by centifuging, the mother liquor from the centrifuges after the addition of makeup water being returned to the dissolvers and the crystals being calcined to soda ash.

In the earlier work on the use of sodium sulfide as a precipitant, it had been theorized that the amount of iron actually dissolved in the clarified and filtered trona solution would be extremely small, since this solution is slightly alkaline—having a pH of about 9.5—and thus contains a concentration of hydroxyl ions amply sufficient to almost completely precipitate any iron salts present in the solution. It is well known that ferric hydroxide and ferric oxide are only very slightly soluble in water under these conditions. Therefore, due to the extremely low solubility of iron sulfide, it was calculated that only a very low concentration of sulfide ion—on the order of 5–10 parts per million (p.p.m.) at most—is necessary to completely precipitate the low concentrations of iron that would reasonably be expected to be present in the alkaline solutions going to the crystallizers.

This addition of sodium sulfide in these amounts did cause a visible effect in the process liquors, which became colored from yellow to green, but the liquors were largely unaffected by decolorizing and filtering operations. As indicated above, this resulted in very objectionable discoloration of the sesquicarbonate crystals which as shown by Example 2 hereinafter given contained a large amount of iron and by the fouling of the centrifuges. This earlier work had shown that this precipitate—some type of iron-sulfur complex—was apparently suspended in a very finely divided colloidal form, which remained in the hot solutions discharged from the filter, and on cooling was deposited on the crystals in the crystallization step. Thus, the problem posed was to remove iron in a manner so as to prevent its subsequent deposition on the crystals during the crystallization procedure.

In this re-examination and re-study of the problem, the scope of the research extended all the way back to the dissolving of the trona, and even to the treatment of the trona mineral. It was found desirable to eliminate as much non-sesquicarbonate material as possible from the mineral, including any magnetic impurities which could be removed by the usual magnetic separations. As indicated above, the iron content of the prepared mineral averaged about 0.2%, calculated as $Fe_2O_3$, in the trona charged to the dissolvers, although it had been theorized that only a very low proportion of these iron compounds was actually carried into solution. Repeated re-examinations of these hot, concentrated, filtered solutions surprisingly showed, however, that actually up to several hundred p.p.m. of iron were being dissolved or dispersed and carried through in the filtered solutions going to the crystallizers.

This discovery of the high iron content of the solution was entirely unexpected, considering the mildly alkaline nature thereof. It was, of course, known that highly alkaline solutions, such as caustic soda, may readily contain relatively high concentrations of soluble iron, and these have been explained on the basis that the iron functions anionically, forming, for example, sodium ferrate. However, this theory did not appear tenable in relation to a sesquicarbonate solution, which is high in carbonate and bicarbonate ions, but relatively low in hydroxyl ion concentration. It may well be, however, that the iron is solubilized in the form of a complex with the sesquicarbonate molecule, with the result that it is carried through into the filtered crystallizer solution.

It had been reported in the chemical literature that alkaline solutions containing iron in the form of sodium ferrate, $Na_2FeO_2$, or sodium ferrite, $NaFeO_2$, which may be the simplest forms of anionic iron compounds, may react with alkali sulfides, giving dark colored solutions, but no precipitation of an iron sulfide. After standing some time, a dark green precipitate may be deposited from this solution, and it was theorized that it is a complex sodium thiohydroxy ferroate. This reported information in some respects corresponds to the results obtained in the earlier trials with small amounts of sodium sulfide, wherein dark green solutions were obtained from which iron sulfide could not be removed by filtration, but which subsequently deposited a greenish contamination on the sesquicarbonate crystals during the crystallization procedure.

The idea was then conceived that the addition to the process solutions of a greatly increased concentration of sodium sulfide—up to a hundredfold increase—would be worth trying, on the grounds that such a high concentration might chemically convert and reduce all iron compounds—whether organic, anionic or cationic—to the ferrous oxidation state, regardless of the complex form in which the iron might be present, and thus make possible the precipitation of the iron in the form of an insoluble iron-sulfur complex, or even as ferrous sulfide.

Accordingly, tests were performed wherein the concentration of sodium sulfide was raised to about 1000 parts per million, giving an actual sulfide concentration of nearly 500 parts per million.

It was immediately discovered that considerable difficulty was involved in raising the sulfide concentration to such a high level. Counteracting factors included the loss of sulfide through volatilization as hydrogen sulfide from the hot solutions, particularly when the solutions were under low pressure in passing through the vacuum crystallizers. Another difficulty arose in oxidation of the sulfide whenever the hot liquors were exposed to the air, as in open tanks.

However, as soon as the sulfide concentration reached the intended high level of about 400–500 parts per million, a vast improvement in the operation of the process was immediately observed. The solution going from the filters to the crystallizers was light green in color, but no precipitate was now deposited on the crystals discharged from the centrifuges, and the centrifuges could be operated continuously without the interruption.

At the same time, the iron content of the product dropped sharply, to the level of only a few parts per million, whereas before the iron content had ranged up to as high as 250 parts per million. The color of the final product was greatly decreased also, the calcined soda ash now being almost colorless, or pure "white."

Some of the iron compounds had been precipitated and removed in the clarification and/or filtration step, apparently in the form of a complex containing iron, sodium and sulfur. This precipitate is mixed with other impurities removed in the clarification or filtration, and the determination of its exact nature is complicated by the presence of other impurities present in the settling and filter cake, however, a substantial concentration of sulfide remained in the process liquor going into the crystallization step and operated to prevent precipitation of iron with the crystals in the precipitation step.

The following examples will serve to illustrate the invention.

EXAMPLE 1

Trona mineral was dissolved in hot water at a near boiling temperature of about 98° C., clarified by setting, decolorized with activated carbon, and subjected to a crystallization operation. The sodium sesquicarbonate crystals were tinged a brownish red color, and the calcined soda ash made from them had a definite reddish coat. The iron content of the calcined soda ash prepared by this procedure ranged from 100–300 parts per million, calculated as $Fe_2O_3$, depending upon the quality of the trona mineral and other more or less uncontrollable operating variables.

EXAMPLE 2

Sodium suilfide was dissolved in water and added to the process liqours by introducing it on the intake side of the pump which feeds the clarifiers. Enough sodium sulfide was added to give about 5–10 parts per million of $S=$ in the process liquors. The iron content of the filtered process liquors remained in the range of about 300–400 parts per million, and a large amount of dark green, slimy precipitate was deposited on the crystals in the centrifuges. The iron content of the calcined soda ash product was in the range of about 150–200 parts per million during the period covered by this test.

EXAMPLE 3

In another test conducted similarly to Example 2, the sulfide concentration was increased nearly 100-fold, to give a process liquor sulfide concentration on the order of about 600–700 parts per million going to the crystallizers. This solution was still slightly greenish colored, but no precipitate was formed on the crystals discharged from the centrifuges. The calcined soda ash was almost pure white, and the iron content of the product during this run was in the range of 5–15 parts per million.

EXAMPLE 4

In another test, conducted similarly to Example 3, the sulfide concentration in the process liquors was maintained in the range of about 300–400 parts per million. The operation of the process was still greatly improved, and substantially different than obtained at the very low sulfide levels typified by Example 2. The iron content of the calcined soda ash during this run was on the order of 20–30 parts per million, and the product was of a very satisfactory, low color.

EXAMPLE 5

In still another test, conducted similarly to Example 3, the sulfide in the process liquors leaving the dissolvers was maintained at a concentration of 200–300 parts per million over a period of 40 hours. The operation of the process was satisfactory during this period and the iron content and color of the product were such as to readily meet commercial specifications which required less than 30 p.p.m. iron in the finished soda ash.

Figure 2:
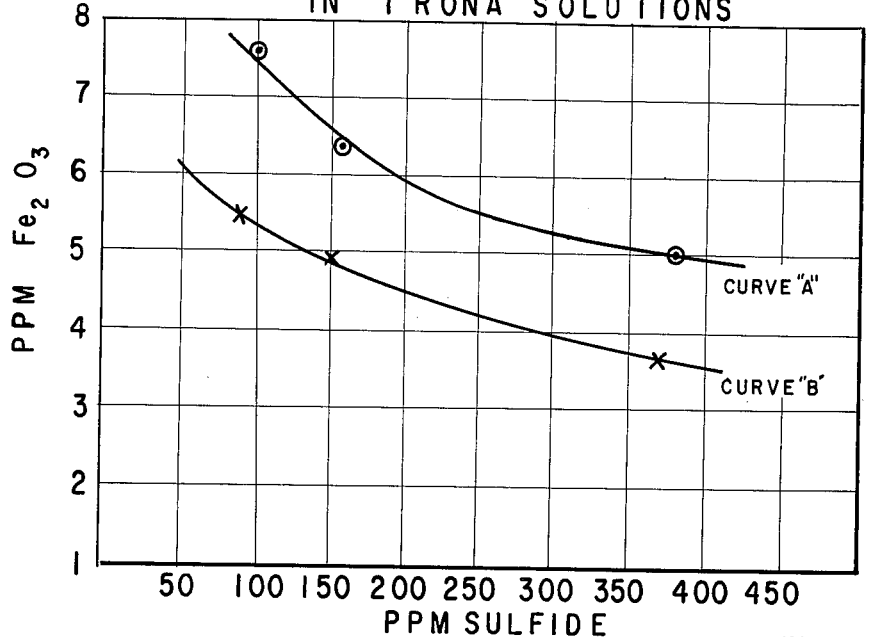
Figure 3:
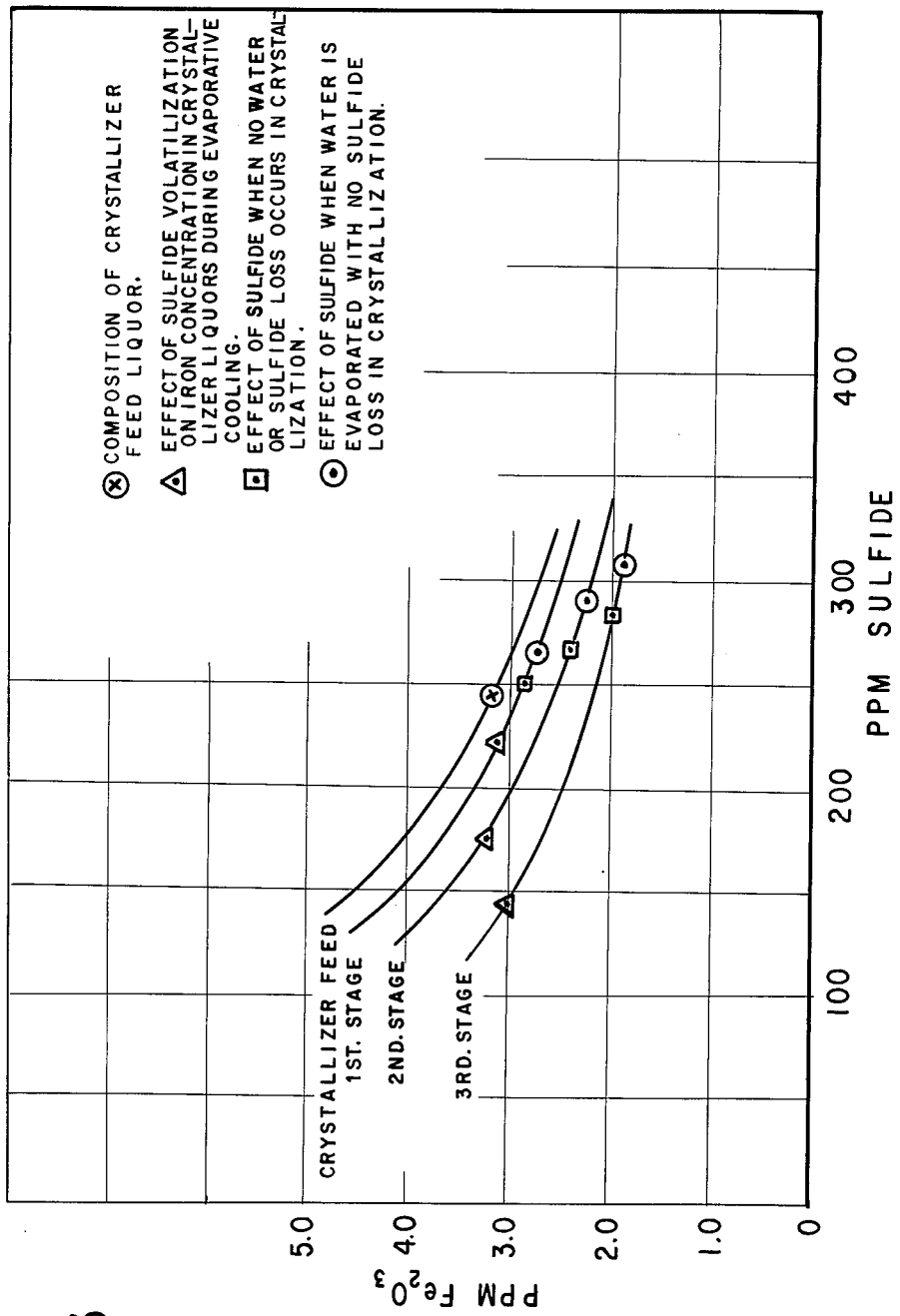

In the accompanying drawings,

FIG. 1 shows the effect of the sulfide on iron solubility in solutions of trona containing admixed shale therein, FIG. 2 shows the effect of the presence of sulfide in the mother liquor prior to the contacting of the mother liquor and the trona in a dissolving operation, and FIG. 3 shows the iron-sulfide relationship in the crystallizer liquors at various temperatures of the crystallizers.

In the dissolving step, iron is dissolved from the trona and from the shale associated with the crude trona. More of the dissolved iron appears to come from the shale than from the trona itself, but it is impossible to separate the trona from the shale prior to the dissolving operation.

When crude trona is dissolved in a mother liquor corresponding to the mother liquor from the sequicarbonate crystallization step, but containing no sulfide in the mother liquor, the iron content of the solution is about 7 to 12 p.p.m. $Fe_2O_3$. When sulfide is present in the recirculating mother liquor this depresses the iron solubility and produces a solution with a lower iron content.

FIG. 1 shows the results of a series of laboratory tests on the effect of sulfide in depressing the iron solubility in the trona mother liquor and shows that the presence of about 220 p.p.m. or more of sulfide in the dissolving liquor reduced the iron dissolved from the trona from in excess of 7 p.p.m. to below 3 p.p.m. The iron in the final soda ash in the absence of sulfide is normally about 10 times the amount in the crystallizer solution so that a solution containing 7 p.p.m. $Fe_2O_3$ will produce soda ash containing about 70 p.p.m. $Fe_2O_3$, whereas a solution containing 3 p.p.m. or less of $Fe_2O_3$ will produce soda ash containing less than 30 p.p.m. $Fe_2O_3$.

FIG. 2 shows the results of a series of laboratory tests in which typical trona shale picked from mine run trona having a high iron content was agitated (Curve A) for 30 minutes in a mother liquor originally containing no sulfide after which sulfide was added and the solution agitated for another 30 minutes, and Curve B for one hour in a mother liquor to which the sulfide was added before contact with the trona shale mixture. As is shown by Curve B the presence of the sulfide in the dissolving liquor before contact with the trona shale mixture reduces the amount of iron dissolved. Similar agitation is necessary in plant dissolving of trona.

The laboratory tests summarized in FIGS. 1 and 2 show that the presence of over 100 p.p.m. sulfide in the dissolving liquor significantly depresses or decreases the iron solubility in the dissolving mother liquor.

In a series of plant tests the additional sulfide necessary to replace that lost in the process was added to the mother liquor collecting tanks, receiving mother liquor separated from the crystals in the centrifuges, mother liquor from other sources and makeup water instead of between the dissolvers and the clarifiers, so that the mother liquor contained a total of 301 p.p.m. before entering the dissolvers and the sulfide balance through the plant was determined. This sulfide balance is shown in the following Table I.

Table I.—Sulfide balance

| Location | Liquor x10⁶ lb. | S⁼, p.p.m. | Gain or loss S⁼, p.p.m. | S⁼, lb. | Gain or loss, S⁼, lbs. |
|---|---|---|---|---|---|
| Mother liquor | 0.894 | 301 | | 269 | |
| Dissolvers | 1.044 | 261 | −40 | 272 | +3 |
| Clarifiers | 1.000 | 246 | −15 | 246 | −26 |
| Filtrate | 1.000 | 246 | 0 | 246 | |
| Crystallizer feed | 1.000 | 246 | 0 | 246 | |
| 1st Stage crystallizer | 0.932 | 223 | −23 | 208 | −38 |
| 2nd Stage crystallizer | 0.852 | 172 | −51 | 147 | −61 |
| 3rd Stage crystallizer | 0.800 | 141 | −31 | 113 | −34 |
| Added to the mother liquor | | 160 | +160 | 156 | 156 |

In the above table the p.p.m. S⁼ was determined by the standard cadmium precipitation method for determining sulfide. The gain or loss in p.p.m. S⁼ does not parallel the gain or loss in lbs. sulfide because of changes in volume of the liquors and for other reasons.

The apparent minor sulfide gain in the dissolvers is not a gain in sulfide but is due to an unknown reducing agent in the ore insolubles that analyses as sulfide. It is impossible to filter the samples before analysis; therefore, the analysis at the dissolvers is not the true sulfide value but the sulfide value plus an unknown factor. Previous work showed that the unknown material is removed when the insolubles are removed by clarification or filtration. Therefore, the true sulfide change can only be measured across the dissolvers and clarifiers taken together. As shown in Table I the sulfide loss from the dissolvers through the clarifiers is 23 lbs. A breakdown of this loss on the same basis as Table I is as follows:

Sulfide balance, dissolvers—clarifiers

|  | Lb. |
|---|---|
| Sulfide in the liquor lost with the insolubles | 5 |
| Volatilization to atmosphere in dissolvers and clarifiers | 1 |
| Lost in precipitation and settling | 17 |
| Total | 23 |

The sulfide listed as lost in the precipitation and settling of iron and insolubles is calculated by difference. Laboratory results check with the above figures indicating that about 17 lbs. of sulfide are consumed when allowed to react with a similar amount of trona in solution.

Table I shows the loss of sulfide which occurs from the liquor during the crystallizing process. Due to the vacuum evaporative cooling, the liquor sulfide concentration decreases, thereby increasing the iron solubility. The iron then remains in solution rather than precipitating with the crystals, as a result of evaporation and cooling.

FIG. 3 shows the iron-sulfide relationship in the crystallizing liquors at the various temperatures of the crystallizers. (The curves in FIG. 3 were established by data during normal plant operation.) The iron solubility deincreases in the liquor as the temperature decreases in each stage and the sulfide concentration in the liquor determines the iron solubility at any given liquor temperature. The mark "⊗" on the crystallizer feed curve of FIG. 3 is the starting sulfide and iron levels for all examples used. The marks "△" indicated on the curve for the three crystallizer stages are averages from several plant tests. They show that the iron level in the liquor stays almost constant due to the decreasing sulfide concentration, even though the liquor is reduced in volume by evaporation. However, because the quantity of liquor decreases through the crystallizers, there is some precipitation of iron which goes with the crystals. The marks "⊙" are based on the same crystallizer feed starting point. They show what the liquor sulfide and iron concentrations would be if only water was evaporated and no sulfide was volatilized with the water from the system and show that under these conditions more iron would precipitate with the crystals. In this case a larger amount of iron would be precipitated from the liquor and would go with the crystals.

If the solution were cooled by external means with no loss of water or sulfide, the system shown by points indicated by "□" would exist and here also more iron would precipitate with the crystals. The column at the left of FIG. 3 indicates the iron in the crystallizer solutions in all instances.

The comparison of the amount of iron precipitated and going with the crystals in each case is further explained with reference to Table II.

Table II.—Crystallizer operation with different sulfide and iron concentrations

TEST NO. I.—△-CRYSTALLIZATION WITH LOSS OF WATER AND SULFIDE (PRESENT SYSTEM—PLANT DATA)

| Location | Liquor, lb. | Crystals, lb. | S⁻ in liquor, p.p.m. | Fe₂O₃ in liquor, p.p.m. | Fe₂O₃ in crystals, p.p.m. | Fe₂O₃ in soda ash, p.p.m. |
|---|---|---|---|---|---|---|
| Crystallizer feed | 100.0 | | 246 | 3.22 | | |
| 1st stage crystallizer | 93.2 | 4.64 | 223 | 3.22 | 4.7 | |
| 2nd stage crystallizer | 85.2 | 9.37 | 175 | 3.26 | 4.7 | |
| 3rd stage crystallizer | 80.0 | 12.00 | 141 | 3.05 | 6.5 | 8.8 |

TEST NO. II.—□-CRYSTALLIZATION WITH LOSS OF NEITHER WATER NOR SULFIDE

| Location | Liquor, lb. | Crystals, lb. | S⁻ in liquor, p.p.m. | Fe₂O₃ in liquor, p.p.m. | Fe₂O₃ in crystals, p.p.m. | Fe₂O₃ in soda ash, p.p.m. |
|---|---|---|---|---|---|---|
| Crystallizer feed | 100.0 | | 246 | 3.22 | | |
| 1st stage crystallizer | 96.0 | 4.00 | 256 | 2.90 | 11.0 | |
| 2nd stage crystallizer | 92.3 | 7.67 | 267 | 2.45 | 12.5 | |
| 3rd stage crystallizer | 91.1 | 8.89 | 270 | 2.05 | 15.2 | 21.6 |

TEST NO. III.—⊙-CRYSTALLIZATION WITH LOSS OF WATER BUT NOT SULFIDE

| Location | Liquor, lb. | Crystals, lb. | S⁻ in liquor, p.p.m. | Fe₂O₃ in liquor, p.p.m. | Fe₂O₃ in crystals, p.p.m. | Fe₂O₃ in soda ash, p.p.m. |
|---|---|---|---|---|---|---|
| Crystallizer feed | 100.0 | | 246 | 3.22 | | |
| 1st stage crystallizer | 93.2 | 4.64 | 264 | 2.80 | 13.1 | |
| 2nd stage crystallizer | 85.2 | 9.37 | 289 | 2.30 | 13.4 | |
| 3rd stage crystallizer | 80.0 | 12.00 | 308 | 1.80 | 14.8 | 21.0 |

The above data shows that the presence of sulfide in the dissolving liquor prior to contact with the crude trona depresses or reduces the initial iron solubility from the crude trona and that without sulfide volatilization in the crystallizers in the process of this application the combination of iron in the product during the crystallizing process would be higher and that the sulfide functions in the above application in several ways. (1) To initially depress or decrease the iron solubility in the dissolving trona mother liquor. (2) To precipitate any iron dissolved in the liquor which is precipitated at the temperature of 95 to 98° C. and settle this precipitate out of the trona solution in the clarifiers. (3) To reduce the precipitation of the iron which would normally be precipitated in cooling from 95° C. to 45° C. and by reduction of the liquor volume so that most of the iron goes with the mother liquor solution and less is deposited with the crystals, whereby (by the use of a high excess of sulfide over that theoretical sulfide equivalent of the soluble iron in the trona ore) the iron contamination of the final soda ash produced from solutions of crude trona is kept low enough to provide a readily saleable product.

Many tests have shown that the sulfide concentration must be maintained—for a most desirable processing and product quality—at a level of at least about 200 parts per million of actual sulfide, through substantial benefits are realized at levels as low as 100 parts per million. It is preferable to maintain the level at about 300–400 parts per million, for various reasons, one of which is to compensate for fluctuations in impurity content of the trona mineral. Still higher levels—up to 800–1000 parts per million—have been found satisfactory, but the higher levels obviously involve greater expense, and result in a higher rate of loss due to volatilization of hydrogen sulfide and oxidation by contact with air. The lower the sulfide level within the range above 200 p.p.m. the less the loss of sulfide and the lower the cost of the sulfide treatment.

Furthermore, and surprisingly enough, it has been found that doubling or tripling the sulfide concentration above the desirable minimum level of about 200 parts per million does not yield a corresponding gain in smoothness of process operations or quality of final product. A further reduction of iron content in the calcined soda ash results, but the change compares in no way with the greater change which follows if the sulfide concentration is allowed to drop substantially below the safe level indicated. When the latter occurs, the process operations are immediately disrupted and the iron content of the product may increase as much as 10-fold.

From theoretical considerations, one might predict that the use of sulfide concentrations as disclosed in this invention would—because of the very low solubility of iron sulfide—reduce the soluble iron in the liquors to the vanishing point. Calculations show that the amount of residual iron to be expected would be a very small fraction of one part per million. In fact, as indicated above, one might predict that essentially the same results would be obtained by the use of only a few parts per million of sulfide. The failure as disclosed above to obtain such predicted results amply illustrates the complexity of the problem and the unexpected nature of the solution provided by the instant invention.

We do not know all the reasons why a large excess of sulfide works to reduce iron contamination of soda ash produced from crude trona and why the use of the small amount of sulfide theoretically necessary to react with and precipitate all the iron present in the trona solutions does not work, and we do not wish to be bound by any of the theories herein set forth. We believe, however, that the presence of in excess of 200 p.p.m. of sulfide in the recirculating mother liquor going to the dissolvers depresses the iron solubility from the crude trona ore and that the vaporization of part of the excess sulfide which occurs in the crystallizers operating under low pressure (vacuum) as the trona solutions are cooled from around 95° C. to crystallize sodium carbonate therefrom, decreases the sulfide concentration in the trona liquors, thereby increasing the solubility of the iron which would otherwise be precipitated as iron sulfide in the crystals and that the iron which would otherwise precipitate with the crystals as a result of cooling and/or evaporation remains in solution in the mother liquor, instead of precipitating with the crystals, and that this iron is precipitated when additional sulfide is added to the mother liquor going to the dissolvers.

Normal sodium sulfide, $Na_2S$, is the preferred form of compound for adding sulfide ion, since a foreign cation is not involved. The same desirable result is obtained by the use of sodium hydrosulfide or hydrogen sulfide, but normal sodium sulfide is preferred. The use of soluble sulfides of other cations is operative, but has the objection of introducing the different cation. Sulfur itself is suitable, to the extent that it dissolves in the hot process liquors.

Various modifications of the process of the invention may be made without departing from the spirit or scope thereof, and it is to be understood that the invention is limited only as defined in the appended claims.

We claim:

1. The method of preparing substantially iron free crystalline sodium sesquicarbonate from crude trona mineral containing iron which comprises dissolving the crude trona in a recirculating sodium sesquicarbonate mother liquor carrying sufficient sulfide dissolved therein to substantially depress the iron solubility in said recirculating mother liquor at the point of solution of the crude trona mineral, separating insolubles from said solution with a decrease of about one-sixth in the amount of sulfide present at the point of solution of the crude trona mineral, crystallizing sodium sesquicarbonate from said solution while volatilizing about one-third of the sulfide present at the point of solution of the crude trona mineral from the crystallizer solution to cause a portion of the iron held as sulfide in said solution to remain with the mother liquor, separating the crystals from said solution, returning the mother liquor to dissolve more crude trona, and adding sufficient sulfide to said recirculating mother liquor to maintain the sulfide concentration therein between 100 and 1000 p.p.m.

2. The method of preparing substantially iron free crystalline sodium sesquicarbonate from crude trona mineral containing iron which comprises dissolving the crude trona in a recirculating mother liquor carrying a twenty fold excess of sulfide dissolved therein over that theoretically necessary to precipitate all the iron in said trona, to substantially depress the iron solubility in said recirculating mother liquor at the point of initial dissolution of the crude trona, separating insolubles from said solution, crystallizing sodium sesquicarbonate from said solution while volatilizing sulfide therefrom to reduce the sulfide concentration to between 100 and 200 p.p.m. and release iron to dissolve in said solution, separating the crystals from said solution, returning the mother liquor to dissolve more crude trona, and adding sufficient sulfide to said recycling mother liquor to bring the sulfide concentration to above 200 p.p.m.

3. The method of preparing substantially iron free crystalline sodium sesquicarbonate from crude trona mineral containing iron which comprises dissolving the crude trona in a recirculating mother liquor carrying sulfide in excess of 200 p.p.m. dissolved therein to substantially depress the solubility of the iron in said crude trona in said recirculating mother liquor at the point of initial dissolution of the crude trona, separating insolubles from said solution, crystallizing sodium sesquicarbonate from said solution while volatilizing sulfide therefrom to cause some of the iron held as sulfide to dissolve in said solution, separating the crystals from said solution, adding makeup water and returning the mother liquor to dissolve more crude trona, and adding sufficient sulfide to said recycling mother liquor to bring the sulfide concentration to above 200 p.p.m. before said mother liquor contacts said crude trona.

4. The method of preparing substantially iron free crystalline sodium sesquicarbonate from crude trona mineral containing iron which comprises dissolving the crude trona in a recirculating mother liquor carrying sulfide in excess of about 300 p.p.m. dissolved therein to substantially depress the iron solubility in said recirculating mother liquor at the point of initial dissolution of the crude trona, separating insolubles from said solution, with a decrease in the sulfide content of the solution of about 55 p.p.m. crystallizing sodium sesquicarbonate from said solution while volatilizing about 100 p.p.m. sulfide therefrom to reduce the sulfide concentration to between 100 and 200 p.p.m. and release iron to dissolve in said solution, separating the crystals from said solution, adding makeup water and returning the mother liquor to dissolve more crude trona, and adding sufficient sulfide to said recycling mother liquor to bring the sulfide concentration therein to above about 300 p.p.m. before said returning mother liquor contacts said crude trona.

5. The method of preparing substantially iron free crystalline sodium sesquicarbonate from crude trona mineral containing iron which comprises dissolving the crude trona in a recirculating mother liquor carrying sulfide in excess of 100 p.p.m. dissolved therein to substantially depress the solubility of the iron in said crude trona in said recirculating mother liquor at the point of initial dissolution of the crude trona, separating insolubles from said solution, crystallizing sodium sesquicarbonate from said solution while volatilizing sulfide therefrom to release iron held as sulfide to dissolve in said solution, separating the crystals from said solution, adding makeup water and returning the mother liquor to dissolve more crude trona, and maintaining the sulfide concentration in said recycling mother liquor above 100 p.p.m. before said mother liquor contacts said crude trona.

6. The method of preparing substantially iron free crystalline sodium sesquicarbonate from crude trona mineral containing iron which comprises dissolving the crude trona in a recirculating mother liquor carrying sulfide in excess of 300 p.p.m. dissolved therein to substantially depress the iron solubility in said recirculating mother liquor at the point of initial dissolution of the crude trona, separating insolubles from said solution, crystallizing sodium sesquicarbonate from said solution while volatilizing sulfide therefrom to release iron held as sulfide to dissolve in said solution, separating the crystals from said solution, adding makeup water and returning the mother liquor to dissolve more crude trona, and adding sufficient sulfide to said recycling mother liquor to bring the sulfide concentration therein to above 300 p.p.m. before said returning mother liquor contacts said crude trona.

7. In the preparation of substantially iron free crystalline sodium sesquicarbonate from crude trona mineral containing iron by the process of dissolving the crude trona, removing insolubles from the solution, crystallizing sodium sesquicarbonate therefrom, adding makeup water and returning the mother liquor to dissolve more crude trona, the improvement which comprises adding sufficient sulfide to said recycling mother liquor prior to contact of the mother liquor with said crude trona to substantially depress the iron solubility in said mother liquor at the point of initial dissolution of the crude trona, filtering, and after the filtration maintaining a sulfide concentration of from 100 to 1000 parts per million in said process liquors at the point of crystallization and crystallizing the sodium sesquicarbonate from the filtered process liquors in the presence of said sulfide concentration.

8. In the recovery of purified sodium carbonate from material from the group consisting of Wyoming trona and calcined Wyoming trona by dissolving said material in a recycling mother liquor and crystallizing and recovering sodium carbonate from said solution, that improvement which comprises adding sodium sulfide to said solution in an amount sufficient to precipitate the soluble iron from said solution and to maintain a sulfide concentration in said solution of from 100 to 1000 parts per million, separating the insolubles from said solution, leaving a sulfide concentration of 100 to 1000 parts per million therein at the point of crystallization and crystallizing and recovering sodium carbonate containing less than 30 parts per million of iron therefrom, adding makeup water to the mother liquor and returning said mother liquor to dissolve more of said material and adding sufficient sulfide to said solution to bring the sulfide concentration to above 200 p.p.m. before said returning mother liquor contacts said crude trona.

9. In the production of soda ash from solutions produced by dissolving material from the group consisting of crude trona and calcined crude trona containing iron in a recycling mother liquor solution, the improvement which comprises adding sulfide to said mother liquor prior to contacting the mother liquor with the material from the group consisting of crude trona and calcined crude trona in an amount sufficient to substantially depress the iron solubility in said solution at the point of initial dissolution of the material from the group of crude trona and calcined crude trona and to precipitate the soluble iron therein and to maintain a sulfide ion concentration in said solutions of from 100 to 1000 parts per million at the point of crystallization, separating the solids impurities from said solution, crystallizing sodium carbonate containing crystals from said solution in the presence of said sulfide concentration while volatilizing sulfide therefrom to release a portion of the iron to dissolve in said solution, separating said crystals from the mother liquor, calcining said crystals to produce soda ash containing less than 30 parts per million of iron therein, adding makeup water to the mother liquor and returning the mother liquor to dissolve more trona, and adding sufficient sulfide to said returning mother liquor to bring the sulfide concentration to above 200 p.p.m. at the point of initial dissolution and before said returning mother liquor contacts said crude trona.

10. The method of producing soda ash from material from the group consisting of crude Wyoming trona and calcined crude Wyoming trona containing in excess of 0.10% iron therein which comprises dissolving the sodium carbonate values from the material from the group consisting of crude trona and calcined crude trona in the presence of the iron contamination present in the trona and depressing the iron solubility in said solution by adding sulfide to the solution prior to the dissolution step in amounts of 100 to 1000 p.p.m., separating the solid impurities from said solution, crystallizing sodium carbonate-containing crystals from said solution in the presence of a sulfide concentration of 100 to 1000 p.p.m., separating said crystals from the mother liquor and calcining said crystals to produce soda ash containing less than 30 p.p.m. iron therein.

References Cited by the Examiner

UNITED STATES PATENTS 2,388,009 10/45 Pike _____ 23—38
2,537,034 1/51 Churchward _____ 23—63

FOREIGN PATENTS 206,010 7/56 Australia.

MAURICE A. BRINDISI, Primary Examiner.

GEORGE D. MITCHELL, BENJAMIN HENKIN,
Examiners.